United States Patent [19]
Hartl et al.

[11] Patent Number: 6,146,471
[45] Date of Patent: Nov. 14, 2000

[54] SPHERICAL PLAIN BEARING AND METHOD OF MANUFACTURING THEREOF

[75] Inventors: Werner Hartl, Plainsboro; Bogdan T. Mania, Lawrenceville, both of N.J.

[73] Assignee: Roller Bearing Company of America, West Trenton, N.J.

[21] Appl. No.: 09/288,260

[22] Filed: Apr. 8, 1999

[51] Int. Cl.[7] .............................. C23C 8/20; B21D 53/10; B21K 1/76; B23P 17/00
[52] U.S. Cl. ..................... 148/206; 148/225; 29/898.13
[58] Field of Search .................... 148/206, 225; 29/898.13

[56] References Cited

U.S. PATENT DOCUMENTS

| | | | |
|---|---|---|---|
| 3,623,781 | 11/1971 | Roos | 308/72 |
| 3,677,032 | 7/1972 | Suzuki | 64/17 A |
| 3,737,204 | 6/1973 | Burkhardt | 308/241 |
| 3,795,960 | 3/1974 | Elmore et al. | 29/148.4 |
| 3,831,241 | 8/1974 | Elmore et al. | 29/148.4 |
| 3,899,225 | 8/1975 | Elmore et al. | 308/174 |
| 3,913,988 | 10/1975 | Scales et al. | 308/8.2 |
| 3,954,517 | 5/1976 | Jatczak et al. | 148/16.5 |
| 4,004,952 | 1/1977 | Jatczak et al. | 148/39 |
| 4,012,238 | 3/1977 | Scales | 148/6 |
| 4,495,006 | 1/1985 | Aves, Jr. et al. | 148/16.5 |
| 4,659,241 | 4/1987 | Bamberger et al. | 384/625 |
| 4,664,722 | 5/1987 | Clinkscales et al. | 148/14 |
| 4,765,757 | 8/1988 | Hartl | 384/213 |
| 4,871,268 | 10/1989 | Furumura et al. | 384/492 |
| 4,888,065 | 12/1989 | Grell | 148/16.5 |
| 4,904,094 | 2/1990 | Furumura et al. | 384/492 |
| 4,913,749 | 4/1990 | Hengerer et al. | 148/165 |
| 4,930,909 | 6/1990 | Murakami et al. | 384/492 |
| 5,030,017 | 7/1991 | Murakami et al. | 384/492 |
| 5,122,000 | 6/1992 | Matsumoto et al. | 384/492 |
| 5,127,967 | 7/1992 | Verhoff et al. | 148/222 |
| 5,165,804 | 11/1992 | Fisher et al. | 384/492 |
| 5,292,200 | 3/1994 | Matsumoto et al. | 384/492 |
| 5,336,338 | 8/1994 | Toda | 148/319 |
| 5,413,643 | 5/1995 | Murakami et al. | 148/319 |
| 5,531,836 | 7/1996 | Dezzani et al. | 148/233 |
| 5,560,787 | 10/1996 | Takagi et al. | 148/319 |
| 5,567,508 | 10/1996 | Murakami | 428/217 |
| 5,648,611 | 7/1997 | Singh et al. | 73/598 |
| 5,698,159 | 12/1997 | Ochi et al. | 420/104 |
| 5,780,165 | 7/1998 | Fukumoto et al. | 428/472.1 |

*Primary Examiner*—Daniel J. Jenkins
*Assistant Examiner*—Nicole Coy
*Attorney, Agent, or Firm*—Sperry, Zoda & Kane

[57] ABSTRACT

The improved spherical plain bearing of the present invention is formed using a unique method of manufacture which includes surface hardening of the outer ring and the inner ring wherein the outer ring includes a fracture zone having a reduced cross-sectional area which allows the case hardening diffusion technique to penetrate much deeper into the ring fracture zone than in the other areas thereof. In this manner the reduced cross-section area of the outer ring provides a more brittle area with less of the more ductile interior steel which is more difficult to fracture. Such fracturing is necessary with such plain spherical bearings in order to allow placement of the inner ring within the outer ring. The spherical plain bearing produced by this method can include a single fracture or double fracture. Thus this bearing provides significant structural strength due to the inner core of softer more ductile steel while at the same time providing enhanced wear characteristics due to the case hardened outer layer on both the inner and outer races.

11 Claims, 4 Drawing Sheets

SPHERICAL PLAIN BEARING AND METHOD OF MANUFACTURING THEREOF

BACKGROUND OF THE INVENTION

1. Field of the Invention

The present invention deals with the field of spherical plain bearings which, by definition, have spherical contact surfaces which allow the inner ring to rotate freely with multiple degrees of freedom while positioned within the bearing outer ring. This multiple movement capability gives this type of bearing the ability to self-align such that it automatically adjusts to any misalignment which may occur due to application requirements or machining tolerances, welding distortions or mounting deformations due to any static and dynamic forces. Machining and distortion misalignment difficulties normally would generate considerable end loading and cause the early failure of conventional plain cylindrical sleeve bearings. Spherical plain bearings have been devised for the purpose of accommodating application, manufacturing and distortion misalignment for which sleeve bearings are not capable or are inadequate.

The main problem with respect to such spherical plain bearings is in the difficulty in positioning of the inner ring with the outer ring during assembly thereof. Since the outer ring has a spherical bearing surface it normally has a side aperture smaller than the size of the inner ring and thereby placement of the inner ring within the bearing cavity of the outer ring becomes a problem.

Originally this problem was overcome by forming of loading slots on diametrically opposite sides of the outer ring which were slightly wider than the inner ring. With such a configuration the bearing can be easily assembled merely by rotating the inner ring ninety degrees and sliding it through this loading slot followed by re-rotating of the inner ring back to the operating position, which will also retain the inner ring within the outer ring.

Such side loading through a mounting slot generated numerous other problems. For example, it usually required the removal of a significant portion of the contact area between the bearing surfaces which appreciably reduces the radial and thrust capacity of the bearing in the direction of the loading slots. Also it made the final bearing assembly more sensitive to the orientation of the loading slots relative to the main load direction.

Also lubrication became a problem since it could easily be lost from the spherical bearing surfaces by escaping through the loading slots in the outer ring. Under some applications the use of such loading slots is possible whenever the problem associated with slotting are not encountered. Normally this bearing is used in situations where fracturing of the outer ring is not utilized because the steel from which the outer ring is made is too soft for fracturing and also it is used in other specific situations which require a non-fractured outer ring for one reason or another.

In most applications the use of the loading slot was ultimately replaced by the fracturing or actual breaking of the outer ring. At some times one would fracture at a single location and at other times at double locations. This fractured ring can then be separated to allow placement of the inner ring within the outer ring and will then be closed when placed at the location of use of the bearing. Normally the environmental structure will retain the fractured bearing outer ring closely thereby presenting no problems due to the fracture therein.

The advantage of this design is that it is not sensitive to the specific orientation of the fracture plane with respect to the load direction as long as the outer ring maintains a press fit inside a sufficiently rigid bore defined in a housing. With such a fractured ring configuration normally the lubrication holes are located at a location away from the point of fracture. Fracturing becomes more difficult with the use of bearings which require additional structural strength since fracturing of the more strong or ductile steel compounds, that is, those with lower carbon content is more difficult. Such low carbon or medium carbon steel materials tend to be more ductile and generally softer and, as such it is generally more difficult to fracture or break during the manufacturing process. On the other hand the high carbon content steel tends to be more brittle and abrasive but has significantly enhanced resistance to frictional wear. Such material can be easily fractured, however it also is easily broken or cracked structurally and therefore the integrity can be compromised. For this reason many bearings are made with an interior core of softer more ductile steel for strength and an exterior skin which is surface hardened or case hardened to prevent wear.

One problem here is that in order to form an outer ring configuration with sufficient structural strength the amount of ductile steel used within the core which is difficult to break is significant thereby greatly restricting the ability to form a bearing by the use of the fracture design. Such bearings are commonly used in heavy load applications such as heavy duty off-road vehicles such as graders and mobile hydraulic cranes, hauling trucks, forklift trucks, front-end loaders, log skidders and various types of fully tracked vehicles.

2. Description of the Prior Art

Numerous processes and configurations have been utilized to increase the hardness of bearings while at the same time maintaining a strong more ductile interior structural core. The use of this process with fractured bearings is currently unknown. Examples of similar bearing configurations for similar purposes and addressing similar applications are shown in U.S. Pat. No. 3,677,032 patented Jul. 18, 1972 to T. Suzuki and assigned to Nippon Seiko Kabushiki Kaisha on a "Shell Type Needle Bearing"; and U.S. Pat. No. 3,737,204 patented Jun. 5, 1973 to E. Burkhardt and assigned to FMC Corporation on an "Extended Life Bearing"; and U.S. Pat. No. 3,795,960 patented Mar. 12, 1974 to J. Elmore et al and assigned to The Torrington Company on a "Method Of Forming Outer Bearing Races"; and U.S. Pat. No. 3,831,241 patented Aug. 27, 1974 to J. Elmore et al and assigned to The Torrington Company on a "Radial And Thrust Bearing And Method Of Making Same"; and U.S. Pat. No. 3,899,225 patented Aug. 12, 1975 to J. Elmore et al and assigned to The Torrington Company on a "Radial And Thrust Bearing"; and U.S. Pat. No. 3,913,988 patented Oct. 21, 1975 to S. Scales et al and assigned to Hughes Tool Company on a "Journal Bearing And Method Utilizing High Carbon Surface"; and U.S. Pat. No. 3,954,517 patented May 4, 1976 to C. Jatczak et al and assigned to The Timken Company on a "Method For Making Carburized Bearing Members"; and U.S. Pat. No. 4,004,952 patented Jan. 25, 1977 to C. Jatczak et al and assigned to The Timken Company on "Carburized Bearing Members"; and U.S. Pat. No. 4,012,238 patented Mar. 15, 1977 to S. Scales et al and assigned to Hughes Tool Company on a "Method Of Finishing A Steel Article Having A Boronized And Carburized Case"; and U.S. Pat. No. 4,495,006 patented Jan. 22, 1985 to W. Aves, Jr. and assigned to Dresser Industries, Inc. on "Borocarburizing Ferrous Substrates"; and U.S. Pat. No. 4,659,241 patented Apr. 21, 1987 to E. Bamberger et al and assigned to General Electric Company on a "Rolling Element Bearing Member"; and U.S. Pat. No. 4,664,722 patented May 12, 1987 to D. Clinkscales et al and assigned to Hughes Tool Company-USA on a "Method For Protecting From Hardening A Selected Region Of A Steel Structure"; and U.S. Pat. No. 4,871,268 patented Oct. 3, 1989 to K. Furumura et al and assigned to Nippon Seiko Kabushiki Kaisha on a "Rolling Bearing"; and U.S. Pat. No. 4,888,065 patented Dec. 19, 1989 to K. Grell and assigned to INA Walzlager Schaeffler KG on a "Method Of Making Roller Bearing Element And Product Therefrom"; and U.S. Pat. No. 4,904,094 patented Feb. 27, 1990 to K. Furumura et al and assigned to Nippon Seiko Kabushiki Kaisha on a "Ball-And-Roller Bearing System"; and U.S. Pat. No. 4,913,749 patented Apr. 3, 1990 to F. Hengerer et al and assigned to SKF GmbH on a "Process For Case-Hardening Rolling Bearing Elements Of Low-Alloy Nickeliferous Steel"; and U.S. Pat. No. 4,930,909 patented Jun. 5, 1990 to Y. Murakami et al and assigned to Nippon Seiko Kabushiki Kaisha on a "Rolling Bearing"; and U.S. Pat. No. 5,030,017 patented Jul. 9, 1991 to Y. Murakami et al and assigned to Nippon Seiko Kabushiki Kaisha on a "Rolling Bearing"; and U.S. Pat. No. 5,122,000 patented Jun. 16, 1992 to Y. Matsumoto et al and assigned to Nippon Seiko Kabushiki Kaisha on a "Rolling Bearing"; and U.S. Pat. No. 5,127,967 patented Jul. 7, 1992 to S. Verhoff et al and assigned to Surface Combustion, Inc. on "Ion Carburizing"; and U.S. Pat. No. 5,165,804 patented Nov. 24, 1992 to K. Fisher et al and assigned to General Electric Company on a "Rolling Element Bearing Having Wear Resistant Race Land Regions"; and U.S. Pat. No. 5,292,200 patented Mar. 8, 1994 to Y. Matsumoto et al and assigned to NSK Ltd. on a "Ball-And-Roller Bearing"; and U.S. Pat. No. 5,336,338 patented Aug. 9, 1994 to K. Toda and assigned to Koyo Seiko Co., Ltd. on "Bearing Components And Process For Producing Same"; U.S. Pat. No. 5,413,643 patented May 9, 1995 to Y. Murakami et al and assigned to NSK Ltd. on a "Rolling Bearing"; and U.S. Pat. No. 5,531,836 patented Jul. 2, 1996 to M. Dezzani et al and assigned to The Torrington Company on a "Rolling Bearing And Method Of Making Same"; and U.S. Pat. No. 5,560,787 patented Oct. 1, 1996 to M. Takagi et al and assigned to NSK Ltd. on a "Rolling Bearing For High-Speed Rotation At High Temperatures"; and U.S. Pat. No. 5,567,508 patented Oct. 22, 1996 to Y. Murakami and assigned to NSK Ltd. on a "Rolling Bearing With Surface Hardened Layer"; and U.S. Pat. No. 5,648,611 patented Jul. 15, 1997 to S. Singh et al and assigned to The Timken Company on a "Process For Measuring The Case Depth Of Case-Carburized Steel"; and U.S. Pat. No. 5,698,159 patented Dec. 16, 1997 to T. Ochi et al and assigned to Nippon Steel Corporation on a "Long-Life Carburizing Bearing Steel"; and U.S. Pat. No. 5,780,165 patented Jul. 14, 1998 to S. Fukumoto et al and assigned to Hitachi Metals, Ltd. on a "Bearing Steel Bearing Member Having Excellent Thermal Resistance And Toughness".

SUMMARY OF THE INVENTION

The present invention provides an improved spherical plain bearing which is made by a unique method of manufacture. The bearing itself includes an inner race member formed of carbon steel in the shape of an inner ring normally initially formed of steel having a carbon content of 0.10 percent to 0.60 percent. This inner race is surface hardened usually by heating thereof within a carbon enriched environment otherwise known as "carburizing". Such surface hardening provides a hardened surface on the inner race member to a pre-determined depth which is specifically determined by the amount of heating and the amount of time that the part is exposed to the carbon enriched environment. Normally the carbon content of the surface of the low to medium grade steel part is increased to high carbon content steel in the range of 0.6 percent to 1.0 percent carbon. The inner race member also defines extending therearound an inner race bearing surface which is preferably spherically convex in shape.

The bearing configuration itself also includes an outer race member which is made of steel and is in the form of an outer ring also having a carbon content of 0.10 percent to 0.60 percent. This outer race member is surface hardened also by carburizing to increase the carbon content in the external surface of the outer ring to 0.6 to 1.0 percent carbon for enhancing wear resistance thereof. Also a structural inner core is allowed to remain having the original low to medium carbon content which therefore is more ductile and less brittle than the case hardened outer layer in order to enhance structural strength of this outer race member while retaining the wear resistance of the outer case hardened skin.

The outer race member further includes an outer race body which defines a bearing cavity therein which is adapted to receive the inner race member movably positioned therewithin. This outer race body further defines a lubrication hole extending radially therethrough to facilitate lubrication of the inner race bearing surface and the bearing cavity of the outer race body which is positioned adjacent to it.

The outer race bearing surface in the bearing cavity is spherically concave and is positioned in abutment with and movable with respect to the inner race bearing surface of the inner race member whenever the inner race member is positioned within the bearing cavity of the outer race member.

Most importantly, a fracture zone is defined on the outer race body defining at least one fracture therewithin extending completely through the outer race body at a position away from a lubrication hole. Often the fracture zone is oriented 90 degrees from the lubrication hole but the spacing can vary to other than 90 degrees and still function within the parameters of this invention. This fracture zone includes a reduced cross-section area of the outer race body in order to limit the cross-sectional area of the structural inner core within the fracture zone in such a manner as to enhance the ability to form a fracture therein through the case hardened outer layer since it is more brittle than the structural inner core. Within the reduced cross-sectional area the amount of material in the more ductile core area will be decreased due to the penetrating characteristics of the hardening diffusion. The fracture will preferably extend completely through the outer race member in such a manner as to allow widening of the bearing cavity temporarily to facilitate placement of the inner race member within the bearing cavity of the outer race member with the inner bearing surface and the outer bearing surface being in abutting contact with respect to one another to in this manner facilitate allowing spherical bearing movement therebetween relatively.

The outer race bearing preferably will also define at least one notch within the fracture zone of the outer body extending at least partially into the outer race bearing surface in order to facilitate fracturing thereof by creating a stress riser and reducing the reduced cross-section area within the fracture zone and allowing the hardening compound to further penetrate into the outer race member during surface hardening thereof. In this manner the cross-sectional area of the structural inner core will be reduced within the fracture zone to facilitate fracturing therein.

The reduced cross-sectional area may also be further reduced within the fracture zone by machining steel from at least one location on the outer body of the outer race from the fracture zone prior to surface hardening thereof. Such machining can include drilling which would be the machining of a cylindrical bore within the fracture zone or can also include slotting or the formation of arcuate shaped slots in the fracture zone to further enhance the brittleness within this zone.

The bearing of the present invention is formed by the unique method which includes initially forming the inner race member of steel having a carbon content of 0.10 percent to 0.60 percent carbon with a convex spherical inner bearing surface extending therearound. Thereafter an outer race member is formed of steel having a carbon content of 0.1 to 0.6 percent carbon which defines therein a bearing cavity and a concave spherical outer bearing surface extending therewithin.

A lubrication hole is then machined extending through the outer race member to facilitate lubrication of the convex spherical inner bearing surface and the concave spherical outer bearing surface. Thereafter material is removed from the outer race member in order to define a fracture zone therein to facilitate fracturing of the outer race member within the fracture zone. This material can be removed by multiple means and can include forming at least one notch within the fracture zone extending at least partially into the concave spherical outer bearing surface to create a stress riser and to reduce the cross-sectional area of the structural inner core in order to facilitate fracturing of the outer race member in the fracture zone. At least one radial slot can be machined within the fracture zone to further reduce the cross-sectional area thereof. Finally at least one hole can be drilled in the outer race member within the fracture zone to further reduce the cross-sectional area of the structural inner core to aid in fracturing through the more brittle case hardened material.

After this material is removed as desired, the outer race member is surface hardened to a predetermined depth by heating thereof within a carbon enriched environment to increase the carbon content to 0.60 percent to 1.0 percent carbon steel in order to form a case hardened outer layer or skin which extends completely thereover to increase the wear resistance thereof. Also this case hardening facilitates the fracturing of the outer race member within the fracture zone. A structural inner core will be allowed to remain within the portions of the outer ring not within the fracture zone to enhance the overall structural strength thereof. The inner race member will also be preferably surface hardened to a predetermined depth to increase the carbon content thereof.

The outer race member will then be fractured within the fracture zone defined therein to facilitate placement of the inner ring within the bearing cavity. The fracture will then be widened and the inner race member will be placed within the bearing cavity to make the bearing ready for use.

It is an object of the method of manufacture of the spherical plain bearing and of the bearing itself in the present invention to provide a spherical plain bearing which is case hardened to enhance wear resistance thereof.

It is an object of the method of manufacture of the spherical plain bearing and of the bearing itself in the present invention to provide a spherical plain bearing which has a ductile low carbon steel interior core to maintain the structural strength thereof.

It is an object of the method of manufacture of the spherical plain bearing and of the bearing itself in the present invention to provide a spherical plain bearing which can be easily fractured through a reduced cross-sectional fracture zone to facilitate assembly thereof.

It is an object of the method of manufacture of the spherical plain bearing and of the bearing itself in the present invention to provide a spherical plain bearing which is easy to manufacture.

It is an object of the method of manufacture of the spherical plain bearing and of the bearing itself in the present invention to provide a spherical plain bearing which can be used in very heavy load requirement situations.

It is an object of the method of manufacture of the spherical plain bearing and of the bearing itself in the present invention to provide a spherical plain bearing which can be formed from inexpensive conventional steel alloys.

It is an object of the method of manufacture of the spherical plain bearing and of the bearing itself in the present invention to provide a spherical plain bearing which has very predictable fracturing characteristics.

It is an object of the method of manufacture of the spherical plain bearing and of the bearing itself in the present invention to provide a spherical plain bearing which can be used with heavy all terrain off-road vehicles such as fully tracked vehicles which have extremely high strength demand characteristics.

It is an object of the method of manufacture of the spherical plain bearing and of the bearing itself in the present invention to provide a spherical plain bearing which can be formed utilizing standard carbon penetrating diffusion techniques for case hardening.

It is an object of the method of manufacture of the spherical plain bearing and of the bearing itself in the present invention to provide a spherical plain bearing which is very quick to assemble.

It is an object of the method of manufacture of the spherical plain bearing and of the bearing itself in the present invention to provide a spherical plain bearing which can be used with various different configurations of lubrication grooves or channels.

It is an object of the method of manufacture of the spherical plain bearing and of the bearing itself in the present invention to provide a spherical plain bearing which can be easily case hardened by the introduction of carbon or other steel hardening materials such as boron.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a spherical plain bearing 10 which is formed with an inner race member or inner ring 12 positioned within an outer race member or outer ring 16. Such spherical bearings normally have an opening in the outer race member 16 which is smaller than the size of the inner race member 12 and for this reason require some type of special method of assembly. Such method must allow the inner ring to be placed within the outer ring in order to allow the inner race bearing surface 14 of the inner race member 12 which is spherically convex to come in contact with the outer race bearing surface 18 of the outer race member 16 which is spherically concave.

The present invention provides a unique method for achieving that assembly and a unique configuration for a bearing so assembled. Prior to assembly the inner ring 12 and the outer ring 16 are case hardened or surface hardened in order to form a case hardened outer layer 20. This outer layer is more wear resistant, more brittle and normally is of steel having a higher carbon content than the conventional steel. Normally low to medium carbon content steel is defined as having 0.1 to 0.6 percent carbon and is used for a structural inner core 22 of most items. This material is more ductile, tough and structurally stronger than high carbon hardened steel, however it is more difficult to break since it is less brittle than high carbon hardened steel. It tends to break along a fibrous line rather than along a clean fine line as does the more brittle hardened steel. It should be appreciated that the harder and softer qualities of the steel defined in this invention can be achieved by other methods than merely adding of more or less carbon. Any manner of surface hardening in accordance with any of the conventional methods or methods developed in the future can be utilized and still come within the limits of the method and the spherical bearing disclosed in the present invention as long as these methods allow for hardening by external diffusion. Diffusion by elements such as carbon in such a manner as to form a case hardened outer layer 20 and a structural inner core 22 is the current usual method for forming hardened outer casing layers on steel parts.

The outer race member 16 of the present invention defines an outer race body 24 which defines therein a bearing cavity 26. The outer race bearing surface 18 of the outer race member 16 is defined within the bearing cavity 26. A lubrication hole 28 will preferably also be included extending from the external portion of the outer race member 16 to the internal portion thereof for lubricating of the bearing cavity 26 and thereby lubrication of the outer race bearing surface 18 when in abutting contact with the inner race bearing surface 14 when the inner race member 12 is positioned within the bearing cavity 26.

In accordance with the bearing of this invention a fracture zone 30 will be defined in the outer race member 16. This fracture zone 30 will facilitate the formation of a fracture 32 extending completely through the outer race member 16. The purpose of this fracture is such that when expanded the fracture 32 will increase the size of the access opening in the bearing cavity 26 to allow placement of the inner race member 12 therewithin.

This formation of the fracture 32 is greatly facilitated by first forming of a reduced cross-sectional area 36 within the fracture zone 30 or the outer race member or ring 16. This reduced cross-sectional area within the fracture zone 30 will allow the surface hardening to penetrate through diffusion into the surface of the outer ring 12 to a greater extent. This added penetration will extend into areas which would otherwise be non-hardened if the reduced cross-sectional fracture zone were not being utilized. Thus, when diffusing with carbon, the penetration will extend deeper into the outer ring and greatly reduce the size of the structural inner core 22 within the reduced section fracture zone. That is, due to the fact that there is a reduced cross-sectional area 36 within the fracture zone 30 and given the fact that the case hardening carbon or other element diffuses to the same depth from all surface areas of the outer race member 16, the cross-sectional area of the structural inner core 22 within the fracture zone 30 will be greatly reduced due to the overall reduced cross-sectional area 36 of the outer race body 24 within the fracture zone 30. Inner ring 12 also preferably is formed with structural inner core 68.

Figure 1:
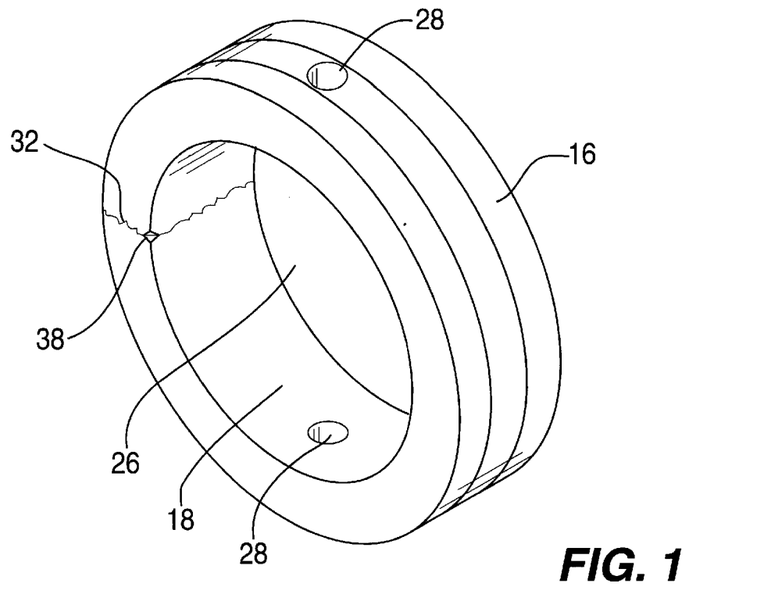
FIG. 1 is a perspective illustration of an embodiment of the fractured outer race member of the present invention showing lubrication holes oriented 90 degrees from the fracture zones thereof.
Figure 2:
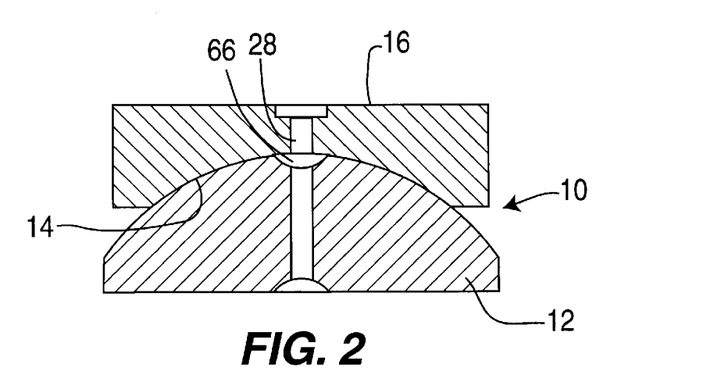
FIG. 2 is a side cross-sectional view of an embodiment of the bearing of the present invention showing the spherical bearing surfaces of an inner and outer rings of the present invention in engagement.
Figure 3:
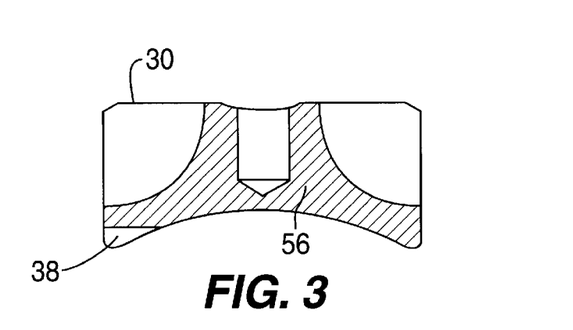
FIG. 3 is a side partial cross-sectional view of an embodiment of the outer ring of the present invention employing a notch means.
Figure 4:
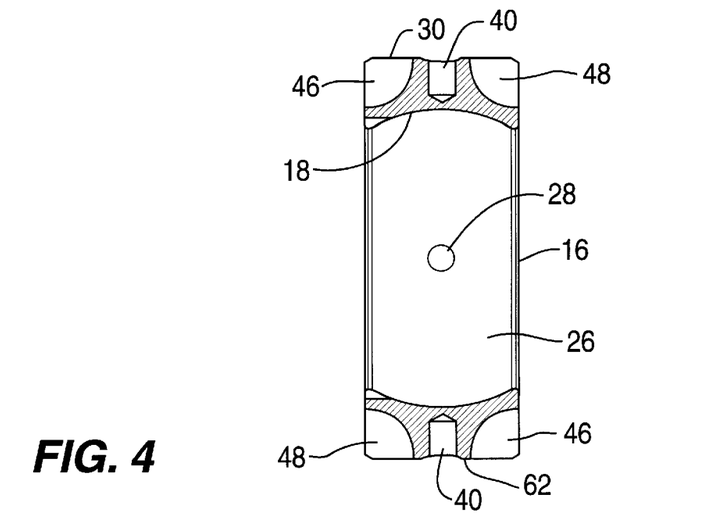
FIG. 4 is a side full cross-sectional view of FIG. 3.
Figure 5:
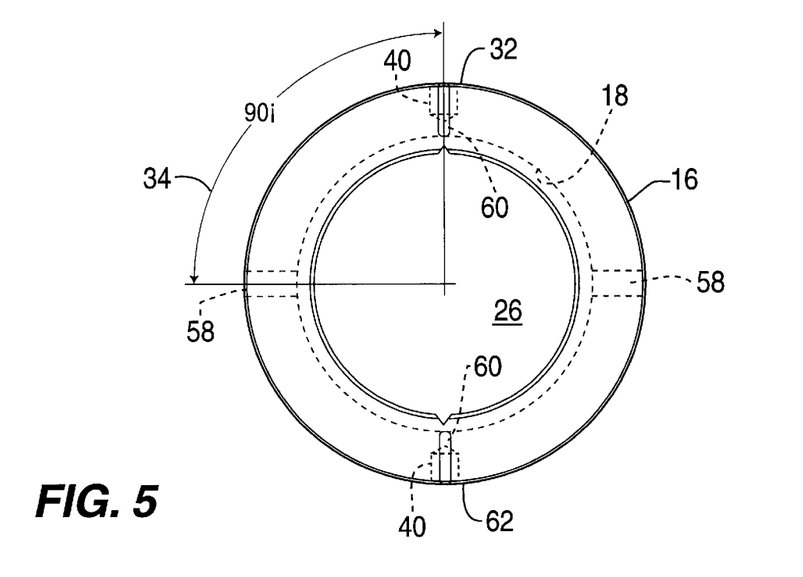
FIG. 5 is an end view of the embodiment shown in FIG. 3.
Figure 6:
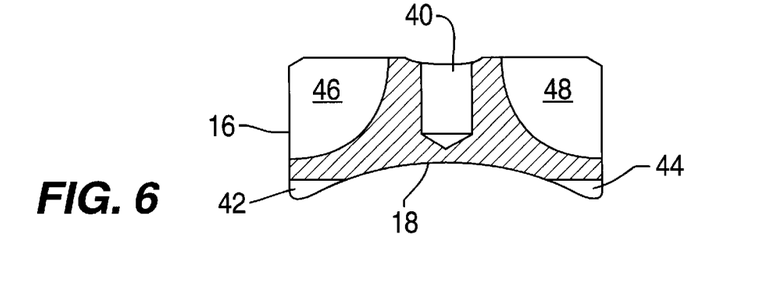
FIG. 6 is a side cross-sectional view showing radial slits, drilled slits and two notches in a configuration of the outer race member.
Figure 10:
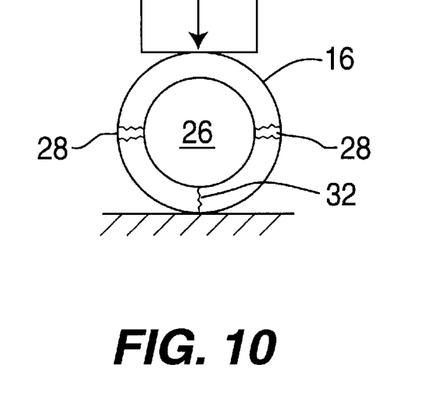
FIG. 10 is a schematic illustration of the use of a press for fracturing an outer ring of a spherical plain bearing.
Figure 11:
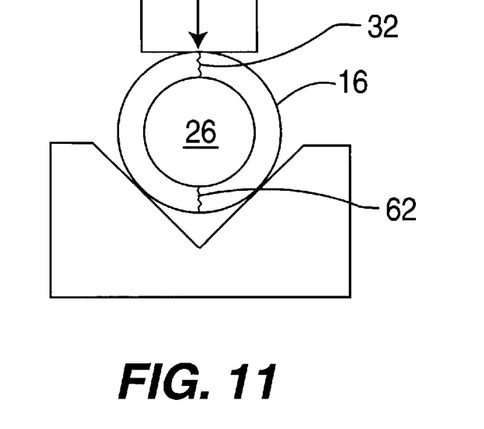
FIG. 11 is a schematic illustration of the use of a press and a V-block for forming a second fracture in an outer race member of a spherical bearing.
Figure 12:
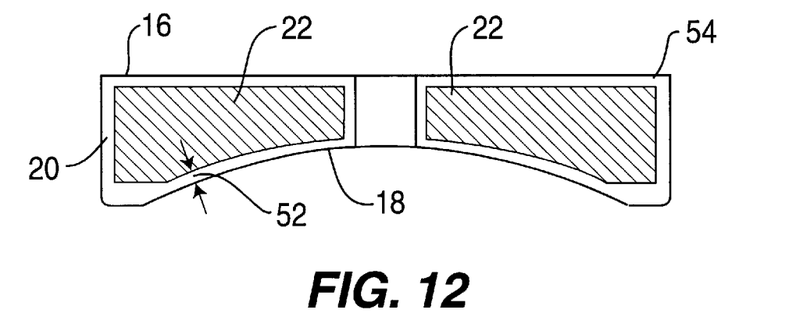
FIG. 12 is a side cross-sectional view of an embodiment of a case hardened outer ring with a lubrication hole extending through the reduced cross-sectional fracture zone.
Figure 13:
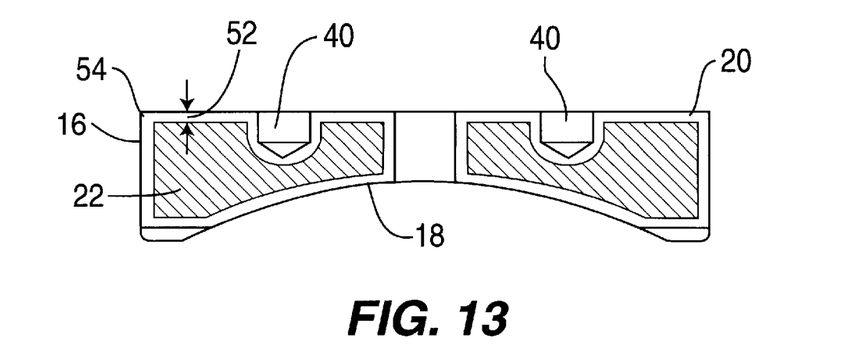
FIG. 13 is an alternative embodiment of an outer race member with multiple machined or drilled holes therein as well as a lubrication hole all defined within the fracture zone to enhance reduction of the cross-sectional area of the structural inner core thereof.

This reduction in cross-sectional area 36 can be achieved by the formation of one or more notches 38. The use of only a single notch 38 is shown best in the configuration of FIG. 3, whereas the use of a second notch means 64 is shown best in FIG. 6. These notches preferably will be located in the edges of the side openings of the outer race member 16 such that they will also function to initiate fracturing as well as allowing the inner core 22 to be smaller after case hardening within the fracture zone 30. Such fracturing normally uses an apparatus such as a mechanical pressure as shown in FIG. 10 for forming a first fracture and, optionally, a second pressing operation for forming a second fracture 62 such as shown in FIG. 11 where a V-block is used to keep the first fracture closed while the second fracture is being formed.

Figure 7:
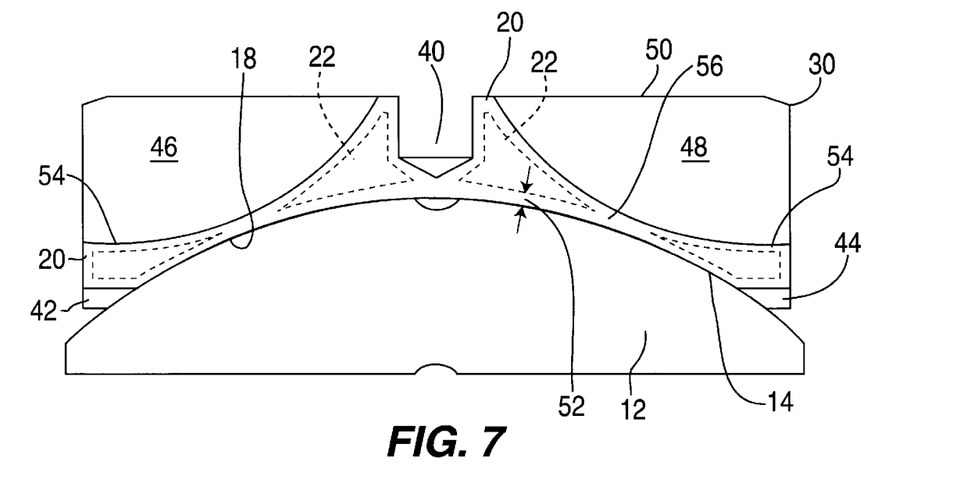
FIG. 7 is a side partial cross-sectional view of an embodiment of the outer race member of the present invention employing two notches means.
Figure 8:
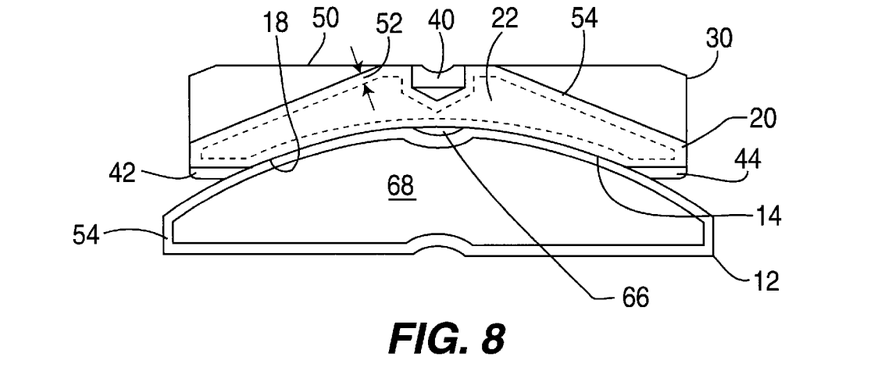
FIG. 8 is an alternative embodiment of the fracture zone of outer race member of the present invention including two slits which are planer rather than radial.
Figure 9:
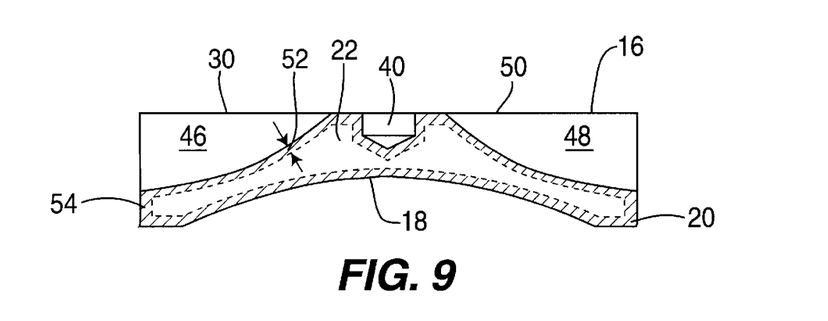
FIG. 9 is a cross-sectional view of an embodiment of a case hardened outer race member of the present invention wherein the reduced section is formed by slots extending at least partially into the bearing surface thereof.

The reduced cross-sectional area within the fracture zone can also be formed by machining operations such as the drilled hole 40 as shown in FIGS. 7,8 and 9. Another method would be the formation of radial slits as shown best in FIGS. 3,6 and 7. These figures show the preferred embodiment at the present time wherein a drilled hole is positioned centrally at the outside of the outer race member 16. Two notches or slots are formed at the edges of the outer race bearing surface 18 such that they extend slightly into this bearing surface. The first notch 42 is positioned at one side of the outer race bearing surface 18 and extends slightly therein and the second notch means 44 is positioned at the opposite side of the outer race bearing surface 18 in such a manner that it extends slightly therein.

A first radial slit 46 is then machined at a position between the first notch means 42 and the drilled holes 40. In a similar manner a second radial slit 48 is machined at a position between the second notch means 44 and the drilled hole 40. With this configuration a removed material area 50 is defined which allows the case hardening layer formed to penetrate to a predetermined depth 52 from the surface area of the object being so treated to extend deeper and thereby significantly reduce the size of the cross-sectional area of the structural inner core 22 only within the fracture zone 30. In this manner fracturing of the outer race member 16 within the fracture zone is significantly enhanced since the more ductile less brittle structural inner core has the cross-sectional area thereof significantly decreased within this area. Another construction for increasing the penetration of the diffusion is in forming the reduced cross-sectional area of the outer ring 12 to the configuration shown in FIG. 8. Here the side intermediate slits are formed with straight lower edges. In configurations of the outer rings, this design will be preferred depending upon geometry and machinability.

The surface hardened area 54 defined within the fracture zone 30 can have the depth thereof controlled by the parameters of the process for case hardening. The temperature, the amount of carbon enrichment or other material within the environment or the amount of time for surface hardening can significantly vary in order to further control the predetermined depth 52 of penetration of the diffusion. If the predetermined depth 52 is great enough the outer race member 16 can define a through hardened area 56 solely contained within the fracture zone 30. Such a completely through hardened area will significantly enhance the capability of fracturing within the fracture zone 30. This through hardened area 56 is achieved when the surface hardened area 54 penetrates with such a large predetermined depth 52 that the structural inner core 22 is completely eliminated from an area within the fracture zone 30.

In other preferred configurations of the present invention various configurations for lubrication holes can be provided. It is preferable that the outer race member 16 defines a lubrication hole extending completely through the ring to lubricate the bearing cavity 26 and the contact areas between the spherically convex inner race bearing surface 14, the lubrication groove 66 thereon, and the spherically concave outer race bearing surface 18. This first lubrication hole can also be configured within the fracture zone in order to enhance the depth of penetration of the case hardening process. Alternatively the lubrication holes can be positioned at a 90 degree angle from one another or from the fracture zone as shown by reference number 34 from the fracture zone. In some configurations a first lubrication hole 58 will be positioned in the fracture zone and a second lubrication hole means 60 will be positioned outside the fracture zone at 90 degrees with respect to the first lubrication hole and at 90 degrees with respect to the fracture zone. With this construction the second lubrication hole will enhance lubrication of the bearing surfaces while the first lubrication hole will also lubricate these surfaces while at the same time enhance the ability to fracture the outer ring 16. Normally bearing member of the present invention are formed from a typical steel such as 8620 steel to enhance structural strength and still facilitate case hardening thereof.

It is important that in accordance with the method of the present invention that the amount of ductile material in the fracture zone is reduced as much as possible while maintaining enough structural strength in the outer ring that it will not break during use. The inner ductile steel core 22 can be completely reduced in which case as described above the outer race member 16 will define a through hardened area 56 within the fracture zone 30. Normally, however, it is preferable to include at least some structural inner core 22 within the fracture zone 30.

The more ductile steel, when it does indeed fracture, breaks in a more fibrous manner and provides mated jagged edges which when placed again in abutment with one another form a very effective seal with specific adhesion properties between the fractured ends. In fact it indeed does become somewhat difficult to pull them apart than from the more smooth hardened steel fracture since there is a slight interaction created between the perfectly mated jagged edges of the more ductile material. Therefore as long as the amount of ductile material remains small in the fractured area the formation of a fracture through this section is still certainly effective.

The construction and method of the spherical plain bearing 10 of the present invention can be used for the forming of single or double fractured outer rings. However, it has particular application in the formation of single fracture outer rings. Such single fractures when widened provide enough additional access to place the inner race member 12 within the bearing cavity 26 of the outer race member 16 while avoiding the inconveniences commonly associated with double fractured systems. However, the method and bearing of the present invention can be formed with a double fracture and still come within the concept of the present invention.

An important aspect of the method of the present invention is in the formation of the fracture zone in the outer race member. This is achieved by forming a removed material area 50 in the outer race member 16 in order to define the zone of fracture 30. Thereafter the outer race member 16 is surface hardened to a specific depth to form the case hardened outer layer extending thereover for increasing wear resistance characteristics of the surface. Also a structural inner core is allowed to remain intact which is more ductile and less brittle than the case hardened outer layer which thereby provides increased structural strength to the basic overall part configuration. Fracturing through the outer race member 16 is made possible due to the notching and machining of the outer race body 24 within the fracture zone 20 which allows the surface hardening to significantly decrease the cross-sectional area of the structural inner core within the fracture zone. As such fracturing is made possible by the application of pressure to the external surface of the outer race ring 16.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A method of manufacturing an improved plain spherical bearing comprising:

A. providing an inner race member of steel with a convex spherical inner bearing surface extending therearound;

B. providing an outer race member of steel defining a bearing cavity therein and with a concave spherical outer bearing surface extending therewithin;

C. removing material from the outer race member in order to define a fracture zone thereon to facilitate fracturing of the outer race member within the fracture zone;

D. surface hardening of the outer race member to a depth therein to form a case hardened outer layer extending thereover to increase wear resistance thereof and to facilitate fracturing of the outer race member within the fracture zone and to define a structural inner core within the case hardened outer layer which is more ductile and less brittle than the case hardened outer layer to enhance structural strength of the outer race member;

E. fracturing of the outer race member at least once within the fracture zone defined therein to facilitate access into the bearing cavity defined therein;

F. widening of the fracture formed in the outer race member to facilitate entry of the inner race member into the bearing cavity defined therein; and G. placing of the inner race member into the bearing cavity of the outer race member with the inner race surface thereof in abutting contact with respect to the outer race surface to allow relative bearing movement therebetween.

2. A method of manufacturing an improved plain spherical bearing as defined in claim 1 wherein said removing material from the outer race member in order to define a fracture zone includes forming at least one notch therewithin extending at least partially into the concave spherical outer bearing surface to reduce the cross-sectional area of the structural inner core to facilitate fracturing of the outer race member within the fracture zone thereof.

3. A method of manufacturing an improved plain spherical bearing as defined in claim 1 wherein said removing material from the outer race member in order to define a fracture zone includes machining at least one radial slot therewithin to reduce the cross-sectional area of the structural inner core to facilitate fracturing of the outer race member within the fracture zone thereof.

4. A method of manufacturing an improved plain spherical bearing as defined in claim 1 wherein said removing material from the outer race member in order to define a fracture zone includes drilling at least one hole in the outer race member within the fracture zone in order to reduce the cross-sectional area of the structural inner core to facilitate fracturing of the outer race member within the fracture zone thereof.

5. A method of manufacturing an improved plain spherical bearing as defined in claim 1 further comprising surface hardening of the inner race member to minimize frictional wear of the convex spherical inner bearing surface.

6. A method of manufacturing an improved plain spherical bearing as defined in claim 1 wherein said surface hardening is performed by heating of the outer race member within a carbon-rich environment.

7. A method of manufacturing an improved plain spherical bearing as defined in claim 6 wherein said surface hardening increases the carbon content of the steel of the outer race member from 0.10%–0.60% carbon to 0.60%–1.0% carbon to increase wear resistance thereof.

8. A method of manufacturing an improved plain spherical bearing as defined in claim 1 wherein said surface hardening is performed to a depth sufficient to completely through-harden the outer race member within the fracture zone to facilitate fracturing therein.

9. A method of manufacturing an improved plain spherical bearing as defined in claim 1 wherein said surface hardening is performed to a depth sufficient to make the case hardened outer layer greater in total cross-sectional area than the cross-sectional area of the structural inner core within the fracture zone.

10. A method of manufacturing an improved plain spherical bearing as defined in claim 1 further comprising providing a first lubrication hole extending through the fracture zone to facilitate fracturing therethrough and to facilitate lubrication of the convex spherical inner bearing surface and the concave spherical outer bearing surface and further comprising a second lubrication hole extending through the outer race member at approximately ninety degrees from the fracture zone for also lubricating the inner and outer bearing surfaces.

11. A method of manufacturing an improved plain spherical bearing comprising:

A. providing an inner race member of steel having a carbon content of 0.1% to 0.6% carbon with a convex spherical inner bearing surface extending therearound;

B. providing an outer race member of steel having a carbon content of 0.1% to 0.6% carbon which defines a bearing cavity therein and a concave spherical outer bearing surface extending therewithin;

C. machining a lubrication hole extending through the outer race member to facilitate lubrication of the convex spherical inner bearing surface and the concave spherical outer bearing surface;

D. removing material from the outer race member in order to define a fracture zone thereon to facilitate fracturing of the outer race member within the fracture zone, said removing material from the outer race member including:

(1) forming at least one notch within the fracture zone extending at least partially into the concave spherical outer bearing surface to reduce the cross-sectional area of the structural inner core to facilitate fracturing of the outer race member within the fracture zone thereof;

(2) machining at least one radial slot within the fracture zone to reduce the cross-sectional area of the structural inner core to facilitate fracturing of the outer race member within the fracture zone thereof;

(3) drilling at least one hole in the outer race member within the fracture zone in order to reduce the cross-sectional area of the structural inner core to facilitate fracturing of the outer race member within the fracture zone thereof;

E. surface hardening of the outer race member to a depth therein by heating thereof within a carbon enriched environment to increase the carbon content thereof to 0.60% to 1.0% carbon in order to form a case hardened outer layer extending thereover to increase wear resistance thereof and to facilitate fracturing of the outer race member within the fracture zone and to define a structural inner core within the case hardened outer layer which is more ductile and less brittle than the case hardened outer layer to enhance structural strength of the outer race member;

F. surface hardening of the inner race member to a depth to increase wear resistance thereof by heating thereof within a carbon enriched environment to increase the carbon content thereof to 0.60% to 1.0% carbon;

G. fracturing of the outer race member at least once within the fracture zone defined therein to facilitate access into the bearing cavity defined therein;

H. widening of the fracture formed in the outer race member to facilitate entry of the inner race member into the bearing cavity defined therein; and I. placing of the inner race member into the bearing cavity of the outer race member with the inner race surface thereof in abutting contact with respect to the outer race surface to allow relative bearing movement therebetween.

* * * * *